United States Patent [19]

Hougen

[11] 4,452,554
[45] Jun. 5, 1984

[54] ANNULAR HOLE CUTTER

[76] Inventor: Everett D. Hougen, G-5072 Corunna Rd., Flint, Mich. 48504

[21] Appl. No.: 474,874

[22] Filed: Mar. 14, 1983

Related U.S. Application Data

[63] Continuation of Ser. No. 303,857, Sep. 21, 1981, abandoned, which is a continuation-in-part of Ser. No. 170,959, Jul. 21, 1980, abandoned.

[51] Int. Cl.³ .................... B23B 41/02; B23B 27/10; B23B 51/00
[52] U.S. Cl. ..................................... 408/206; 408/204
[58] Field of Search ............. 408/204, 205, 206, 207, 408/223, 227, 228, 229, 230, 703

[56] References Cited

U.S. PATENT DOCUMENTS

| Re. 28,416 | 5/1975 | Hougen | 408/204 |
|---|---|---|---|
| 3,130,763 | 4/1964 | Schlosser et al. | 408/205 |
| 3,609,056 | 9/1971 | Hougen | 408/204 |
| 3,765,789 | 10/1973 | Hougen | 408/204 |
| 4,322,187 | 3/1982 | Hougen | 408/204 |
| 4,322,188 | 3/1982 | Hougen | 408/206 |

FOREIGN PATENT DOCUMENTS

EP 24741  3/1981  Fed. Rep. of Germany ...... 408/204

Primary Examiner—Leonidas Vlachos
Assistant Examiner—Jerry Kearns
Attorney, Agent, or Firm—Barnes, Kisselle, Raisch, Choate, Whittemore & Hulbert

[57] ABSTRACT

An annular hole cutter wherein each tooth is formed with at least three cutting edges, each of which is designed to cut a separate chip. The two radially innermost cutting edges are formed on the portion of each tooth which corresponds to the thickness of the web between successive teeth.

10 Claims, 15 Drawing Figures

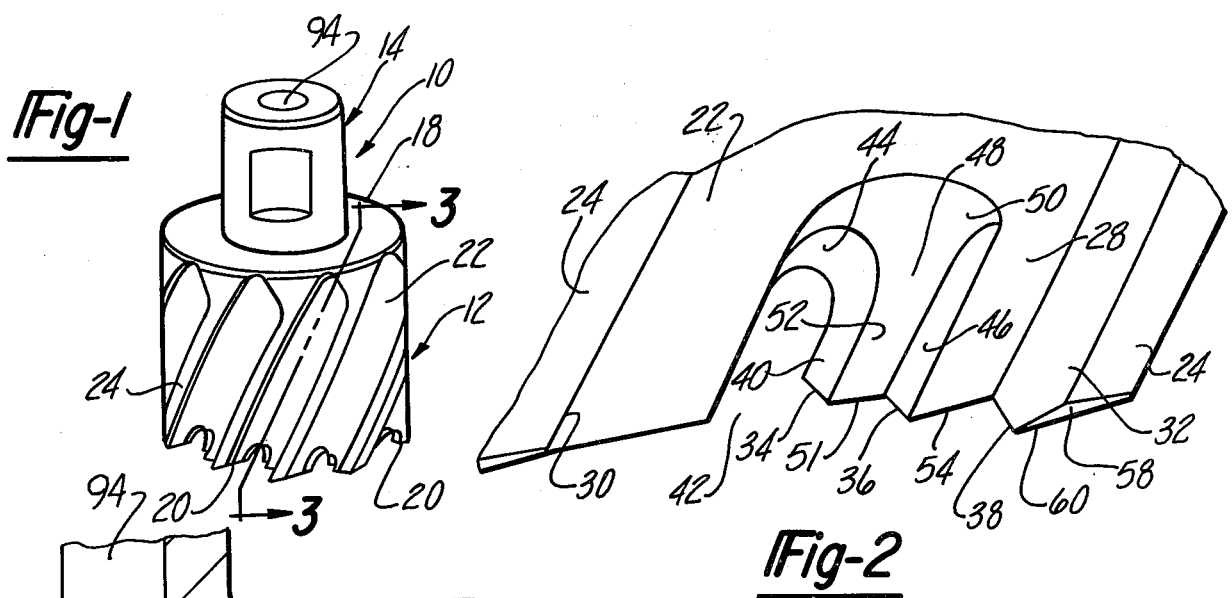
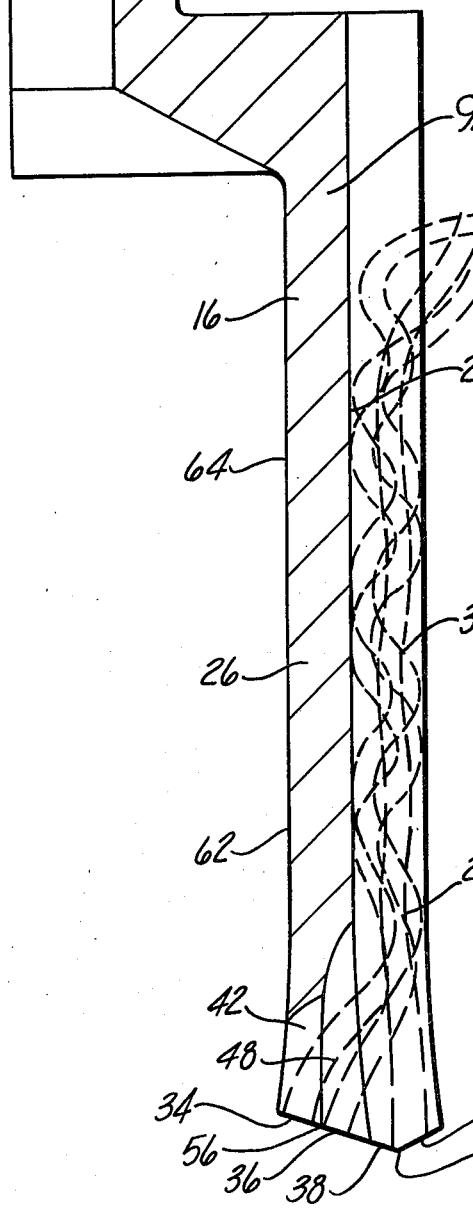
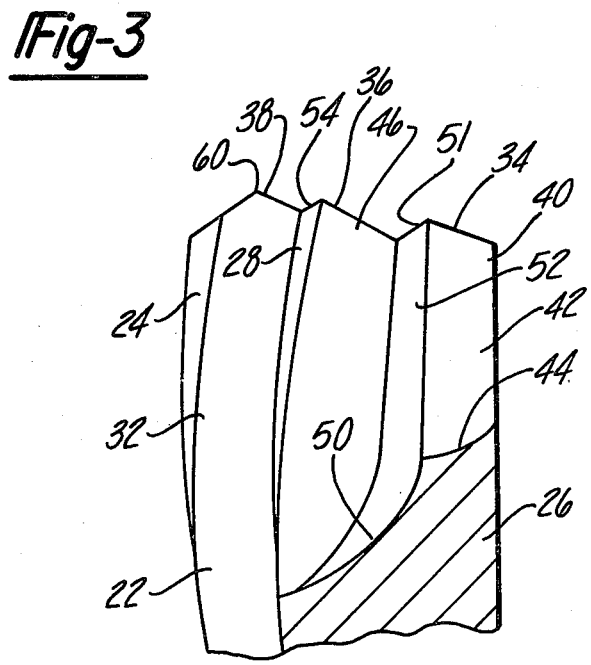

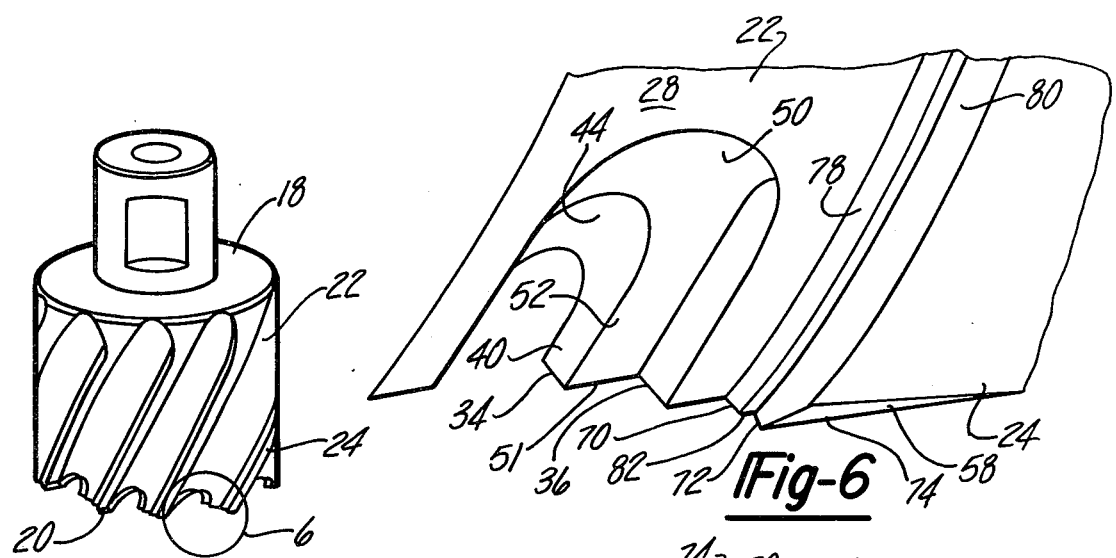
Fig-5
Fig-6
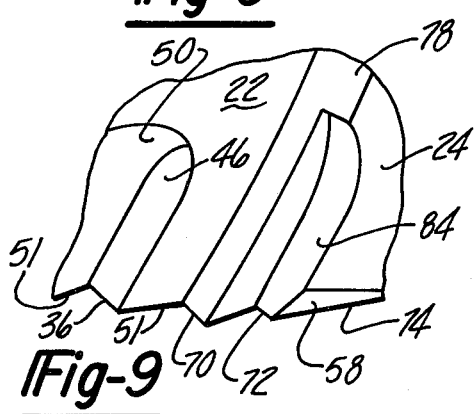
Fig-9
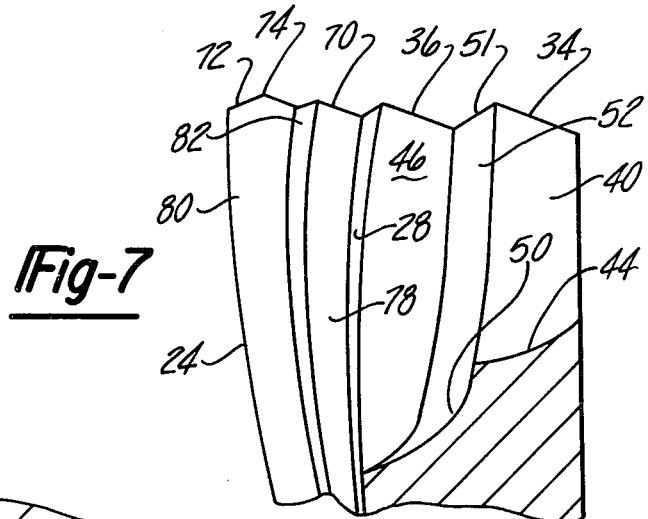
Fig-7
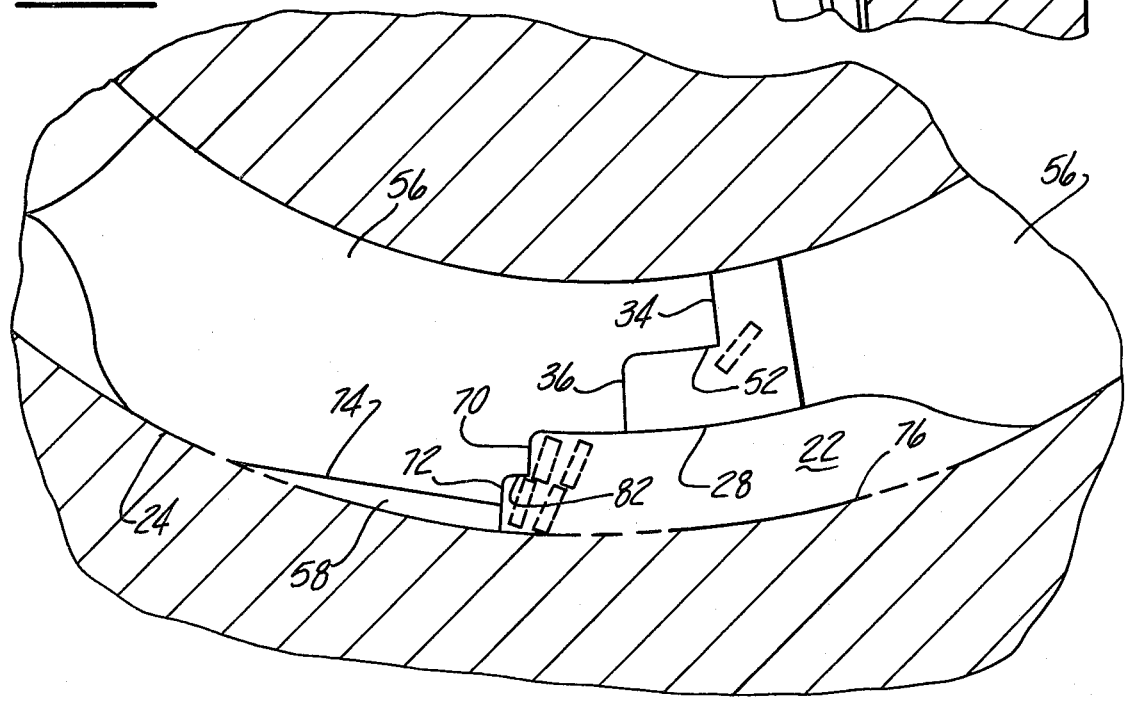
Fig-8

ANNULAR HOLE CUTTER

This invention relates to an annular hole cutter.

In my prior U.S. Pat. No. Re. 28,416 there is disclosed an annular cutter having a plurality of teeth spaced around the leading (lower) end of the cutter. Each tooth is provided with a plurality of circumferentially staggered cutting edges. The cutting edges are designed so that each will cut its own chip. The radially innermost cutting edge extends radially across a shallow gullet formed in the web between successive teeth and the outermost cutting edge extends radially across an outer flute which extends spirally upwardly of the cutter between successive teeth. In accordance with the teaching of my prior patent, the flute has a radial depth equal to about one-half the thickness of the annular wall of the cutter and the web has a thickness equal to about one-half the thickness of the annular wall. Consequently, the radially inner cutting edge of each tooth has a radial extent also equal to about one-half the wall thickness of the cutter. Thus, the flute has a radial depth which is sufficient to accommodate the discharge of chips cut by both cutting edges.

The prior patent referred to also suggests that, if it is desired to provide three circumferentially staggered cutting edges on each tooth so that each tooth cuts three chips instead of two, the radial depth of the flute and the thickness of the web are maintained the same as for the two step tooth cutter and the portion of the cutter wall which corresponds to the depth of the flute is formed into two circumferentially staggered cutting edges rather than a single cutting edge. The radially outermost cutting edge is defined by an outer gullet which has a relatively short axial dimension and opens into the flute. However, the flute still has a radial dimension equal approximately to one-half the wall thickness of the cutter so that it can readily accommodate the chip cut by the radially innermost cutting edge. In addition, the web portion of the wall still has a single cutting edge having a width equal to about one-half the cutter wall thickness and the chip cut by this edge must be displaced radially into the flute.

While the cutter disclosed in my prior patent produces cutting action which is far superior to annular cutters previously used, when the cutter is used to cut holes on a production basis there is a tendency for the chips to not move freely out of the inner gullet and into the flute. When this occurs the cutting action is much slower and a tapered oversized hole with a coarser finish is produced. In addition, the life of the cutting edge is substantially shortened. I have determined that the most practical way of overcoming this problem of poor chip flow out of the gullet and flute of an annular cutter is to provide a cutter design which will produce thin, narrow chips which are easily directed into the flute as soon as they are cut.

Normally as soon as a chip is cut it begins to curl into a spiral. The volume and stiffness of a spiral chip is determined by its width and thickness. If a chip is wide it does not bend readily and occupies a relatively large volume. The net result of a large volume spiral chip is that less chip material can flow upwardly through the passageway defined by a flute in a given amount of time. However, if a chip is narrow it bends easily when it encounters an obstruction, such as the wall of a flute or hole, and requires far less flute depth as it moves upwardly through a flute. A narrow chip can be displaced more readily into the flute and will have less tendency to clog the flute. A narrow chip can also be easily distorted beyond its elastic limit and, thus, fractures easily into smaller fragments. In addition, a narrow chip forms a radially compressible, spring-like spiral helix which is adapted to intertwine with others as it moves up a spiral flute. When such intertwined spiral chips engage the wall of the hole being formed by the cutter, the resulting friction tends to resist their further rotation with the cutter which causes them to be forcibly cammed upwardly by the trailing side wall of the helical flute without clogging the flute. Thus it follows that a flute can be reduced in cross sectional area as the width of the chip is reduced. It also follows that with a cutter side wall of a given thickness, as the size of the flute is reduced, the strength of the cutter is increased since the web between successive teeth will be thicker. A thicker web provides greater rigidity, thus producing a more accurate hole with a better finish. With increased cutter strength a thicker chip may be cut and/or a greater number of teeth may be used; thus a faster cutting action is also obtained.

The primary object of this invention is to provide an annular cutter which cuts more efficiently, more rapidly, and more accurately; produces a better finish and has a longer life.

Another object of the invention is to provide a fluted annular cutter which has a greater resistance to breakage than an equivalent size cutter of the prior art.

A more specific object of this invention is to provide a fluted annular cutter wherein each tooth has a plurality of at least three cutting edges thereon, each of which preferably has a radial dimension substantially less than one-half the wall thickness of the cutter so that the radial dimension of the flute can be as small as about one-third the wall thickness of the cutter and still sufficiently deep to freely accommodate the chip cut by the widest cutting edge.

Another object of this invention is to provide an annular hole cutter which is more efficient than prior art cutters of the same size. This object is obtained by forming each tooth of the cutter with at least three cutting edges, each of which is adapted to cut a separate chip and two of which are formed on that portion of the cutter side wall located radially inwardly of the flute, that is, in the web section between successive teeth.

Another object of the invention is to provide an annular cutter which is admirably adapted to be formed as two axially adjacent sections telescopically joined together so that the leading end portion of the cutter on which the teeth are formed can be made of a relatively expensive cutting tool material, such as high speed steel, and the body portion of the cutter made of a less expensive material, such as a heat-treated, relatively low alloy steel.

Another object of the invention is to provide a design for an annular hole cutter that enables the manufacture of cutters of small diameter and with substantially less tendency to develop hairline cracks when the flutes are ground or heat treated.

A further object of the invention is to provide a design for an annular hole cutter which enables a standard size cutter to be easily reduced in diameter to provide a special size cutter.

A still further object is to provide an annular cutter admirably suited for cutting through a plurality of stacked workpieces.

Another object of the invention is to provide an annular cutter admirably suited for taking heavy cuts without clogging the flutes and gullets.

The preferred form of hole cutter of this invention has an annular side wall formed with a plurality of circumferentially spaced teeth around its lower end and a corresponding number of helical flutes around its outer periphery. Each tooth is formed with a plurality of circumferentially, and preferably vertically staggered, cutting edges, at least two of the cutting edges being formed on that portion of the tooth which corresponds to the thickness of the web between successive teeth and the remaining cutting edges being formed on that portion of the tooth which corresponds to the radial depth of the flute. In one form of cutter according to the present invention the combined width of the two radially inner cutting edges is greater than the combined width of the remaining cutting edges, in which case the thickness of the web is greater than the depth of the flute. In any event, the depth of the flute is at least as great as the width of the widest of the two inner cutting edges. The wall thickness of the cutter may be dimensioned to produce a relatively narrow cutting path so as to maintain the power required to feed the cutter through a workpiece at a reasonably low value.

Other objects, features and advantages of the present invention will become apparent from the following description and accompanying drawings, in which:

FIG. 1 is a perspective view of one form of cutter according to the present invention;

FIG. 2 is an enlarged fragmentary view of a portion of the cutter shown in FIG. 1;

FIG. 3 is a fragmentary sectional view of the cutter along the line 3—3 in FIG. 1;

FIG. 4 is a fragmentary, slightly perspective, sectional view of one tooth of the cutter;

FIG. 5 is a perspective view of another form of cutter according to the present invention;

FIG. 6 is an enlarged fragmentary view of a portion of the cutter shown in FIG. 5 which is designated by the circle 6;

FIG. 7 is a slightly perspective, sectional view of one tooth of the cutter shown in FIG. 5;

FIG. 8 is a fragmentary bottom view on an enlarged scale showing the cutter in relation to the workpiece through which it is being fed;

FIG. 9 is a fragmentary perspective view of a further cutter which is slightly modified with respect to the cutter shown in FIGS. 5 through 8;

Figure 10:
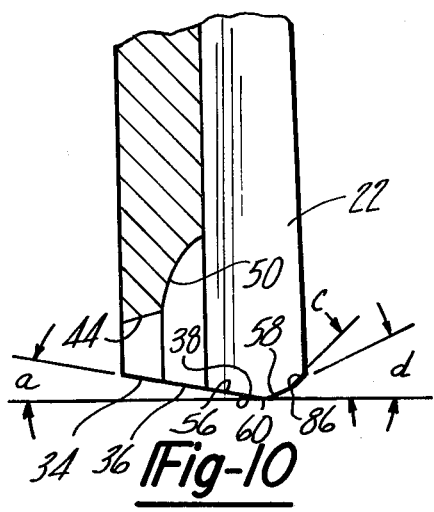
FIG. 10 is a fragmentary vertical sectional view of another form of cutter embodying the present invention.
Figure 11:
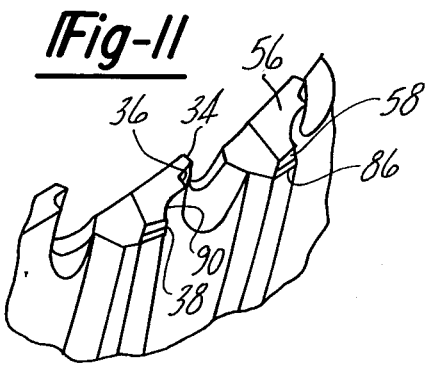
FIG. 11 is a fragmentary perspective view of the cutter shown in FIG. 10.

Referring to the drawings, the annular hole cutter of this invention is generally designated 10 and includes a cutter body 12 and a shank 14. Cutter body 10 is of inverted cup shape having a side wall 16 and a top wall 18. The lower end of side wall 16 is formed with a plurality of cutting teeth 20 which are preferably regularly spaced. A spiral flute 22 extends upwardly around the outer periphery of the cutter adjacent each tooth 20. The successive flutes 22 are separated by a land 24 at the outer periphery of the cutter. In the cutter illustrated the flutes and lands extend the full length of the cutter side wall. For some applications the cutter performs even more effectively when the flutes and lands are substantially shorter than the side wall. The portions of the annular side wall of the cutter between the successive teeth 20 comprise webs 26. The radially outer face 28 of each web 26 defines the radially inner wall of each flute 22. Each flute 22 includes a leading side wall 30 and a trailing side wall 32.

In the form of cutter illustrated in FIGS. 1 through 4 each tooth 20 is formed with three cutting edges 34,36,38. The cutting edge 34 is spaced forwardly in the direction of rotation from the cutting edge 36 and the cutting edge 36 is spaced forwardly in the direction of rotation from cutting edge 38. Cutting edge 34 is located at the lower end of the trailing face 40 of an inner gullet 42. The upper end of gullet 42 inclines radially outwardly in an upward direction as at 44. Cutting edge 36 is located at the lower end of the trailing face 46 of a secondary gullet 48 which is formed in web 26 directly adjacent the inner gullet 42. The upper end of secondary gullet 48 is curved upwardly in a radially outward direction as at 50 above inner gullet 42. Cutting edges 34,36 are separated by a circumferentially extending shoulder 51 at the lower end of the radially inner face 52 of gullet 48. Cutting edge 38 is located at the lower end of the trailing face 32 of flute 22 and is spaced rearwardly from cutting edge 36 by a shoulder 54 at the lower end of flute 22.

The bottom face of each tooth is formed with two back-off or clearance faces 56,58. In the operative condition of the cutter back-off face 56 inclines axially upward and radially inwardly while back-off face 58 inclines axially upwardly and radially outwardly. In addition, each of these back-off faces inclines upwardly from the respective cutting edges in a circumferential direction to a slight extent, say 8 to 10°, to provide the necessary clearance for the cutting edges. The two back-off faces 56,58 intersect in a crest 60 which intersects the radially outermost cutting edge 38. While the back-off faces 56,58 can be ground so that the crest 60 intersects any one of the cutting edges, it is preferred in most instances to have this crest intersect the outermost cutting edge. As a result of the inclinations of back-off faces 56,58, cutting edges 34,36,38 are inclined axially in a radial direction and are staggered vertically as well as circumferentially.

One of the important features of the cutter of this invention resides in the fact that at the lower end of each tooth web 26 has two cutting edges 34,36 formed thereon. In the form of cutter shown in FIGS. 1 through 9 the web has a radial dimension which is preferably greater than the radial depth of the adjacent flute 22. Since the cutting edges 34,36,38 are circumferentially staggered as shown, as the cutter is rotated and fed into a workpiece a separate chip will be cut by each of the cutting edges. The relative dimensions of the cutter are such that the radial depth of flute 22 is not substantially less than and preferably greater than the wider of the two cutting edges 34,36. Thus, immediately after being cut the chip cut by the cutting edge 34 is directed into gullet 48 and then into flute 22 by the radial inclination of this cutting edge and the upper end portions 44 and 50 of gullets 42 and 48. Likewise, immediately after being cut the chip cut by cutting edge 36 is directed by radial inclination of this cutting edge and the curved wall 50 of gullet 48 into the directly adjacent flute 22. The axial dimension of secondary gullet 48 is preferably greater than the axial dimension of gullet 42 so as to promote easy discharge of the chip from cutting edge 34 into gullet 48 and then into flute 22 and thus avoid the tendency for the accumulation and packing of chips in gullet 42. While the inclination of cutting edge 34 has a tendency to direct the chip cut thereby upwardly and outwardly, that is, in a direction perpendicular to the radial direction of edge 34 and the plane of back-off face 56, the circumferential extent of gullet 42 should be sufficiently small to prevent the chip cut by edge 34 from curling to any great extent directly in gullet 42. If gullet 42 is sufficiently small in a circumferential direction, the chip cut by edge 34 tends to remain relatively straight and is directed more readily upwardly and outwardly of the gullet into flute 22. The circumferential width of inner gullet 42 should preferably be not greater than about one-half the thickness of web 26 and on the order of about one-third the thickness of web 26. The circumferential dimension of gullet 42 should vary inversely with the thickness of web 26. Thus, immediately after being cut, the chips formed by cutting edges 34,36 are directed radially outwardly and axially upwardly into flute 22. The chip cut by cutting edge 38 is likewise directed upwardly in flute 22.

Since each of these chips is relatively narrow and tend to form axial, rather than radial, spirals, they are effectively directed in a radially outward direction by the gullets. As the spiral chips from each of the cutting edges move in an axially upwardly and radially outward direction into flute 22, they tend to become intertwined with one another. As soon as the intertwined spiral chips contact the wall of the hole being formed, the friction created thereby tends to arrest rotation of the chips with the cutter. As this occurs, the trailing face 32 of the flute in which they are located engages the spiral chips and cams them upwardly out of the flute. Since the spiral chips are narrow, and expecially if they are also relatively thin, they can easily become compressed between the inner face 28 of the flute and the wall of the hole being formed in the workpiece. Since the trailing face 32 of each flute 22 is formed as a continuous spiral, the flow of chips upwardly in the flutes is continuous, smooth and unimpeded. Thus, if the gullets 42,48 are shaped and dimensioned so as to direct the chips cut by the cutting edges 34,36 substantially immediately into the flute 22 and since the flow of chips in an upwardly direction through the flute is unimpeded or unobstructed, a free flow of chips upwardly out of the flute is assured. The free flow of small chips up the flute is more readily effected when the cutter is supplied internally with coolant under pressure. In addition, since the chips are narrow and inherently weak, they tend to break more readily on exodus from the hole and, thus, do not tend to wrap around the cutter and/or arbor as they exit from the hole being cut and, thus, block or impede the further exodus of chips subsequently cut. Furthermore, as mentioned previously, if gullet 42 is narrow in a circumferential direction, the tendency for the chip cut by edge 34 to curl is impeded so that it is directed into flute 22 in a more straightened condition. This reduces the likelihood of the chip becoming wedged in and clogging the gullet and flute.

If it is desired to provide a slight clearance between the inner periphery of wall 16 and the cylindrical slug being cut, the inner periphery of wall 16 may be tapered outwardly at an angle of about 1° from the lower end thereof for a short distance, for example, ½ inch, as is indicated at 62 in FIG. 3. The portion of the inner periphery of the cutter side wall may be made cylindrical above the tapered portion as indicated at 64. Thus, at a short distance above the cutting edges the inner periphery of the cutter will have a clearance of about 0.008 inches with the outer cylindrical surface of the slug being cut from the workpiece. Clearance between the inner periphery of the cutter wall 16 and the cylindrical slug can also be obtained by making the cylindrical inner periphery slightly eccentric to the outer periphery of the cutter. Also as shown in FIG. 3, if desired, the depth of flute 22 can be made progressively greater in an upward direction by grinding the inner face 28 of the flute so that it tapers radially inwardly up to the section 62 at a slightly greater rate in an upward direction than above this section. This provides radial clearance for the chip cut by edge 38 immediately after being cut. Thus, the flute as a whole may be provided with a cross section of increasing area in an upward direction to more readily facilitate the ejection of chips therefrom. Each flute may also be tapered so that it is circumferentially wider at its upper end than at its lower end.

The provision of a heavy stronger web section while still maintaining the width of all chips very narrow also has the advantage of permitting an axially deeper inner gullet. An axially deeper gullet not only promotes a greater flow of coolant across the cutter teeth, but also permits the teeth to be sharpened for a longer period of time before regrinding the gullets becomes necessary.

It will be appreciated that in order to reduce the power requirements for feeding an annular cutter into a workpiece such as steel, it is necessary that the cutting path or groove formed by the cutter be relatively narrow. For a cutter designed to cut a small or medium size hole in steel, say up to 1 inch in diameter, a practical dimension for the wall thickness of the annular cutter is about 0.160 to 0.180 inches. With such a cutter when each tooth is formed with three cutting edges such as shown in FIGS. 1 through 4 and the side wall of the cutter is approximately 0.180 inches thick, if a thick web is desired the radial depth of flute 22 can be on the order of 0.080 inches and, thus, the thickness of web 26 can be approximately 0.100 inches. The two inner cutting edges 34,36 can have a width of approximately 0.050 inches or, if desired, the innermost cutting edge 34 can have a width of about 0.045 inches and the intermediate cutting edge 36 can have a width of about 0.055 inches. Thus, with a relatively heavy web and a relatively thin annular wall each of the chips cut by the three cutting edges can be readily accommodated in the flute 22. The circumferential dimension of each flute is preferably several times greater than the radial depth of each flute. However, if a thick web is not required, then the cutter is dimensioned so that the thickness of the web is about 0.010 inches less than half the wall thickness of the cutter. Thus, if the cutter side wall is about 0.180 inches thick, the thickness of the web can be about 0.080 inches and the flute can be 0.100 inches deep. In this case cutting edges 34,36 can each have a width of approximately 0.040 inches. In all cases the depth of the flute is greater than the width of both inner cutting edges. When the power available is limited, a large diameter cutter may be formed with a thinner side wall so as to reduce the horsepower required to rotate the cutter. When the side wall is relatively thin the web is preferably thicker than the depth of the flute so as to impart strength to the cutter.

The cutter shown in FIGS. 5 through 8 differs in design from that shown in FIGS. 1 through 4 essentially in only one feature. In the cutter shown in FIGS. 5 through 8 the portion of each tooth which corresponds to the depth of the flute 22 is formed with two cutting edges 70,72 rather than with a single cutting edge as shown at 38 in FIGS. 1 through 4. In this case each of the cutting edges 70,72 can have a width equal to about one-half of the gullet depth. The back-off faces 56,58 on each tooth are inclined in a manner as previously described with reference to FIGS. 1 through 4 and preferably intersect at a crest 74 which, in turn, intersects the outermost cutting edge 72 at approximately the center thereof.

In the cutter illustrated in FIGS. 5 through 8 cutting edge 72 is staggered circumferentially from cutting edge 70 a very slight amount such that these cutting edges produce a single chip having a central line of weakness. As a practical matter, in a cutter designed for cutting holes in steel, edge 72 should be staggered only about one-quarter of the extent of the stagger of the other teeth, preferably not more than about 0.015 inches. The deformed single chip thus cut by edges 70, 72 is very susceptible to fracture as soon as it encounters an obstruction. However, this single weak chip is directed immediately into the large flute 22 which eliminates the tendency for narrow chips to become packed in the portion of the flute between shoulder 82 (FIG. 8) and the side wall 76 of the hole being formed.

If the edge 72 is staggered rearwardly from edge 70 such that each of these edges cut individual chips, then it is preferred that the portion of flute 22 associated with edge 72 be formed as a gullet 84 (FIG. 9) having a vertical extent substantially equal to the vertical extent of gullets 44,50. Thus, when edge 72 is staggered sufficiently to cut a separate chip, the chip so cut is directed by gullet 84 immediately into the large flute 22 and does not tend to clog gullet 84.

When the cutter shown in FIG. 9 is rotated and fed into a workpiece, four separate chips will be cut by the cutting edges 34,36 and 70,72. With the cutter shown in FIGS. 5 through 8 edges 34,36 will each cut separate chips and, as explained previously, edges 70,72 will cut a single more readily breakable chip. In either case, the chip cut by cutting edge 34 will be substantially immediately directed outwardly into flute 22 and the chip cut by cutting edge 36 will also be substantially immediately directed upwardly and outwardly into flute 22. Likewise, the single or separate chips cut by cutting edges 70,72 will be directed upwardly in flute 22.

However, substantially immediately after the chips are cut by cutting edges 34,46,70 and directed into flute 22 they will come into frictional contact with the side wall 76 of the hole being formed in the workpiece. Since the chips which have not fractured will normally have a somewhat spiral configuration, as they engage the side wall the frictional resistance created thereby will have a tendency to arrest rotation of the spiral chips with the cutter. As a result, the chips will be substantially immediately engaged by the trailing side wall portion 78 of flute 22 (FIG. 6) and, in the manner previously described, they will tend to be cammed upwardly out of the flute without obstruction. Thus, because of the small circumferential extent of shoulder 82, with the cutter shown in FIGS. 5 through 8 the chips will not be engaged by and thus trapped by the trailing side wall portion 80 of flute 22. This is desirable since the tendency for any chips to become wedged between the outer periphery of the cutter and the side wall 76 of the hole being formed is substantially reduced. This is especially true if the chips are thin and readily distortable. In addition, since the chips are narrow they are less likely to score the wall of the hole being formed as they flow upwardly through the flutes. Furthermore, the narrow chips are more readily fractured upon exodus from the hole being formed and, thus, are not as apt to wrap around the cutter and/or arbor and, thus, impede the free flow of the chips subsequently formed.

Another advantage of the configurations shown in FIGS. 5 through 8 and 9 wherein the portion of the tooth corresponding to the depth of the flute is provided with two, rather than one, cutting edges resides in the fact that, if it is desired to provide a cutter having an outer diameter of say 0.020 inches smaller than a standard size cutter, it is only necessary to take a finished standard size cutter and grind 0.010 inches off the outer periphery thereof. Thus, the depth of flute 22 will be reduced by only 0.010 inches and will still be sufficiently great to accommodate the width of the chips cut by the other three cutting edges. It will be appreciated that, even with the cutter shown in FIGS. 1 through 4, the outer diameter of the cutter can be ground down to produce a special size cutter, provided that the radial depth of the resulting flute is still substantially as large as the width of the widest chip cut.

A further advantage of the cutter having at least two cutting edges in both the web section and in the portion of the tooth corresponding to the flute depth resides in the fact that when a metal chip is cut it tends to expand as much as 10%. With cutters as shown in FIGS. 5 through 8 and FIG. 9 the depth of flute 22 is more than 10% greater than the width of the largest cutting edge. Thus, the tendency for any of the expanding chips to bind or clog in flute 22 is even further reduced. Even though the edges 70,72 of the cutter shown in FIGS. 5 through 8 cut a single chip, the chip has a central line of weakness and thus readily breaks into small narrow chips.

Another advantage of having two cutting edges on the web portion of the cutter is that, where desired, a heavier wall can be provided and a wider groove can be cut. Heretofore, difficulty was encountered where the width of the cutting edge on the web exceeded about 0.100" because it was difficult to displace the wide chip radially outward into the flute. With the present invention two narrow chips formed by cutting edges on the web section of the cutter can move in a radial and axial direction into the outer flute very readily and a cutting path exceeding 0.200" in width can be easily obtained on a production basis.

The cutters illustrated in FIGS. 10 through 15 are very similar to the cutter illustrated in FIGS. 1 through 4 and differ only slightly therefrom. In the cutter illustrated in FIGS. 1 through 4 the back-off surface 56 is inclined radially inwardly and axially upwardly at an angle of about 20° to 25° and it therefore follows that cutting edges 34,36 are similarly inclined. This is referred to herein as a "positive inside inclination angle". An inclination angle of this magnitude is suitable for cutting holes where the chip load on the cutter is not excessive, for example, 0.002 to 0.003 inches per revolution. The thin chips produced are very flexible and distort quite readily. As pointed out previously, when a chip is cut, it is directed upwardly in a path perpendicular to the plane of the back-off surface and perpendicular to the radial orientation of the cutting edge. Therefore, with a relatively large positive inside inclination angle the chips are directed by cutting edges 34,36 radially outwardly against the side wall of the hole being cut. If the chips are thin they can distort easily and little difficulty is encountered in causing them to be discharged upwardly through the flutes of the cutter as previously described.

If the chips are relatively thick, they will not bend easily when they encounter the side wall of the hole being cut and may tend to clog the flutes when many holes are being cut on a production basis. For this reason a high inclination angle for the cutting edges 34,36 such as shown in FIGS. 1 through 4 is not desirable where the cutter is used on a production basis for cutting numerous holes with a relatively high feed rate, for example, 0.006" chip load. Where the cutter is intended for use under conditions which will produce a high chip load, the radial inclination of the two inner cutting edges should be substantially less than 25° so that the chips will be directed in a more vertically upward direction and less in a laterally outward direction. For heavy chip loads the radial inclination angle of the two inner cutting edges should preferably lie in the range of +10° to −3°.

Figure 14:
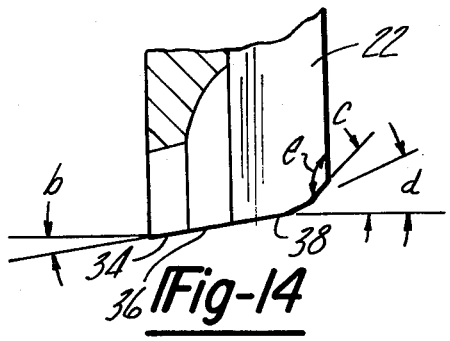
FIG. 14 is a fragmentary vertical sectional view of another form of cutter.
Figure 12:
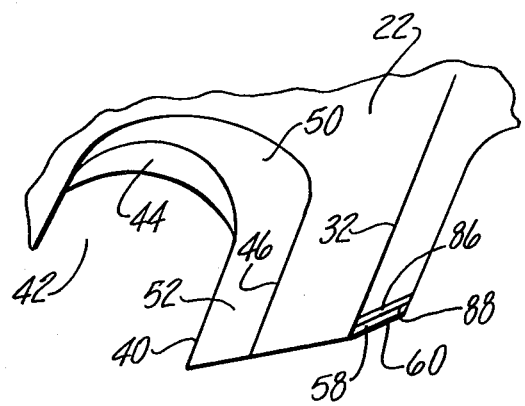
FIG. 12 is a fragmentary elevational view of a portion of the cutter shown in FIG. 10.
Figure 15:
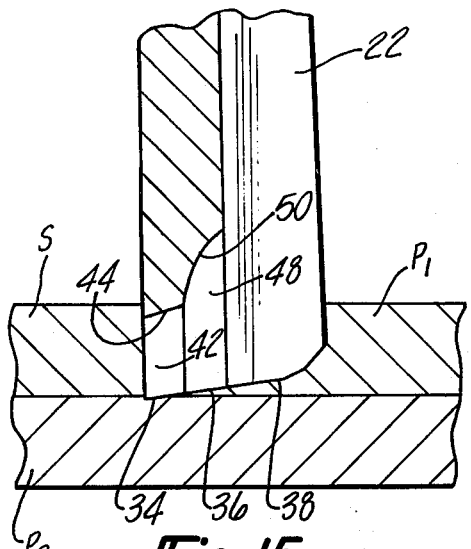
FIG. 15 is a fragmentary vertical sectional view illustrating the manner in which the cutter shown in FIG. 14 is adapted to cut through stacked workpieces.
Figure 13:
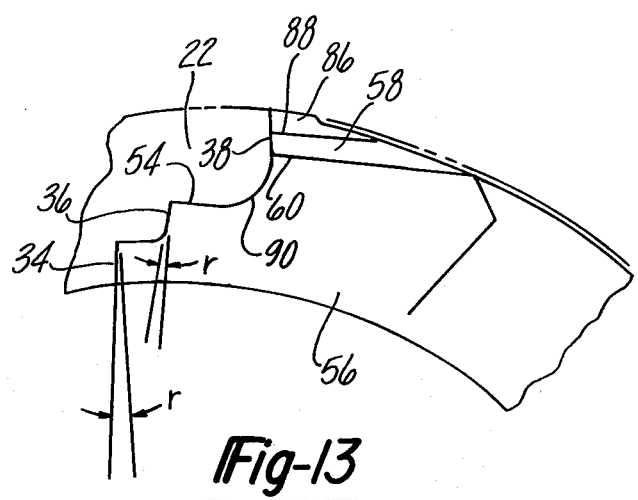
FIG. 13 is a fragmentary end view of the cutter.

In the cutter illustrated in FIG. 10 the inclination angle a of cutting edges 34 and 36 is shown in the neighborhood of +10° and in the cutter illustrated in FIGS. 14 and 15 the inclination angle b of these cutting edges is about −3°. Inclination angles in this magnitude will tend to direct the chips cut by these cutting edges in a more vertical path as compared with an inclination angle of 25°. In the case of relatively low inclination angles it is also preferable to provide these cutting edges with positive radial rake angles r relative to the inner periphery of the cutter, such as shown in FIG. 13. When the radial rake angle of these edges is slightly positive, say up to 10°, each chip cut by these edges is directed slightly radially outwardly and upwardly. Even when the inclination angle is about −3° (FIG. 14) a slight positive radial rake angle (10°) will cause the chips to be directed slightly radially outwardly and vertically upwardly so that the chip will either just clear the upper inclined faces 44 and 50 of gullets 42 and 48 or will engage them at a very slight angle so that they can be deflected upwardly through flutes 22 with very little distortion. A small inclination angle minimizes the required distortion or bending of the chip by either the upper ends of the gullets 42,51 or by the side wall of the hole being cut. Small inclination angles in the range of about +10° to −3° thereby reduce the tendency for the flutes 22 to clog with chips when the chips are relatively thick.

These low inclination angles of the inner cutting edges have several other advantages. As the inclination angle approaches zero it will be appreciated that a cutting edge becomes shorter in length and the chip cut becomes narrower in width. A narrower chip is more readily discharged up the flute than a wider chip and, for this reason, also tends to produce less clogging of the flutes. If the chips flow freely and smoothly up the flutes it requires less horsepower to rotate the cutter than when the chips tend to pack in the flutes. If the cutter is subjected to less torque, it can have a thinner side wall and, since it is stressed to a lesser degree, longer tool life can be expected.

A further advantage of relatively small inside inclination angles is the ability of the cutter to cut holes in stacked material. For example, in FIG. 15 the cutter is shown forming holes in two vertically stacked plates $P_1$ and $P_2$. Since the radially inner end of the cutting edge 34 establishes the leading edge of the tool, it follows that, as soon as the inner end of edge 34 penetrates through the upper plate $P_1$, the slug S inside the cutter is cut cleanly from plate $p_1$ and the cutting edge 34 can then readily penetrate into the underlying plate $P_2$. When the inside inclination angle is increased to as much as +10°, the cutter will still cut readily through stacked material. This is true because, when the crest 60 (FIG. 10) penetrates through the uppermost piece of stock, the radially outwardly extending flange on the center slug is very thin and, even though the slug is cut free, a moderate downward pressure exerted on the cutter is sufficient to cause the cutter to penetrate easily into the underlying stock and thus bend and cut through the thin remaining web or flange around the slug cut from the uppermost piece of material. An inside inclination angle of about +3° has been found to produce excellent results both with respect to heavy chip loads and cutting through stacked material.

As indicated previously with respect to FIGS. 1 through 4, the crest 60 represents the intersection of the two back-off surfaces 56,58 and preferably intersects the outer cutting edge 38. Cutting edge 38 preferably has a positive radial rake angle (not more than about 10°) relative to the outer periphery of the cutter. In the embodiments illustrated in FIGS. 10 through 15 the outer cutting edge 38 is provided adjacent its outer end with an additional back-off surface 86 which is inclined upwardly and radially outwardly at high outer inclination, for example, 40° to 45° to the horizontal. This angle is indicated c in FIG. 10 and the outside inclination angle of back-off surface 58, which is preferably in the range of about 20° to 25°, is designated d. Experience has shown that the inclination of the outermost portion of the outer cutting edge at a rather steep angle, such as 40° to 45°, has several advantages. The high inclination angle not only assists in directing the chip cut by the outer cutting edge inwardly away from the wall of the hole being cut, but also results in a relatively large included angle e at the outer ends of cutting edges 38, that is, the angle between the outer periphery of the cutter side wall and the bottom back-off surfaces. A large included angle at this peripheral portion of the cutter results in less tooth chipping and longer tool life.

As illustrated in FIG. 13, the crest 60 intersects edge 38 approximately midway across the depth of flute 22. Preferably the line of intersection 88 between back-off surface 58 and back-off surface 86 lies about one-quarter the flute depth inwardly from the outer periphery of the cutter. Also as shown in FIG. 13, cutting edge 38 is connected with shoulder 54 with a relatively large radius 90. This rounded shoulder 90 preferably extends forwardly to within at least about 0.040 inches of cutting edge 36. Even though the shoulder between these two cutting edges is curved to this extent, these edges will cut two separate chips provided the two cutting edges are spaced apart vertically a distance greater than the feed rate of the cutter. I have found that as long as these edges are spaced apart about 0.010 inches, two separate chips will be cut. The vertical spacing of these edges is determined by the length of the shoulder between them and the angle of inclination of the back-off surfaces. As pointed out previously, as soon as a chip is cut it tends to expand. A relatively heavy chip will have a tendency to expand a greater amount than a thin chip. The rounded shoulder 90 allows a heavy chip to curl and expand readily without producing a binding effect between the wall of the hole being cut and the shoulder 54. The curled chip cut by edge 38 therefore flows freely up the flute 22.

With a cutter of the present invention the ease of chip ejection and other advantages are obtained without sacrificing any strength in the cutter. This is true because at least three, and preferably four or more, cutting edges are provided on each tooth and the depth of the flute can be substantially less than the width or thickness of the web portion between successive teeth. The strength of an annular cutter having a fluted side wall is determined primarily by the thickness of the web. Thus, if it is determined on a particular cutter that the web must have a predetermined minimum thickness, then the total wall thickness of a cutter of the present invention can be less than on a prior art cutter since with the present invention the depth of the flute can be less than the thickness of the web and still sufficient to accommodate the widest chip cut by any of the cutting edges. A thinner side wall is desirable from the standpoint of cost as well as a narrow cutting path. It should be pointed out however that a thicker web is not critical. As pointed out above, since the web is formed with two cutting edges, the chips are directed much more easily and smoothly into the outer flute. Thus, the stress on the web is substantially less when it is formed with two cutting edges rather than a single cutting edge. Thus, the strength characteristics of the cutter are improved even though the thickness of the web is less than the depth of the flute.

Another advantage of one form of cutter constructed in accordance with this invention is apparent from the showing in FIG. 3. As pointed out above, adjacent each tooth the thickness of the web 26 can, if desired, be substantially greater than the depth of flute 22. This results from the fact that the portion of the tooth corresponding to the web thickness is formed with at least two cutting edges, each of which has a width which is preferably substantially less than the depth of the flute. Thus, if the inner wall 28 of the flute is tapered radially inwardly in an upward direction immediately adjacent its lower end and relatively sharply up to about the section designated 62 in FIG. 3, the chip cut by edge 38 has immediate clearance with the flute. Likewise, when the inner periphery of the cutter adjacent its lower end is tapered radially outwardly in an upward direction, the web 26 has its minimum thickness adjacent the upper end of the cutter side wall at the region designated 92 in FIG. 3, This section 92 then becomes the critical section of the cutter insofar as its strength is concerned. It therefore follows that with a conventional prior art cutter where the depth of a flute adjacent the tooth of the cutter is as great as the thickness of the web, then the total wall thickness of the cutter would have to be substantially greater if the cutter were formed with a flute of increasing depth in an upward direction and with clearance around the inner periphery thereof. It also follows that with a cutter of this invention a substantially greater clearance around the inner periphery of the cutter can be obtained without the need for substantially increasing the wall thickness of the cutter. Greater clearance is also desirable with respect to the ability to increase the flow of coolant to the cutter teeth.

The provision of a relatively thick web and a relatively shallow flute in an annular cutter is also very important from the standpoint of manufacturing. With a given wall thickness, when it is attempted to grind a relatively deep flute in the side wall, there is a very strong tendency to develop small hairline cracks in the web which can result in relatively short tool life. Relatively deep flutes also increase the tendency for hairline cracks to develop during heat treatment. However, if the flute is relatively shallow and the web is relatively thick, the web portion can absorb substantially more heat and, thus, substantially reduce the tendency for such cracks to develop during heat treatment and grinding of the flutes. A shallow flute is also desirable from the standpoint of the cost of manufacture. It can be machined or ground in less time and results in proportionally greater tool life.

Although not shown in the drawings, a majority of annular cutters require a center pilot pin or a center pilot drill. As a practical matter, the bore 94 in shank 14 for retaining the pilot pin or pilot drill has to be at least of a predetermined size. Thus, the inner diameter of the cutter has to be at least equal to the diameter of the pilot pin or pilot drill. Since the cutter of this invention has a web which can be thicker than the depth of the flute, it follows that with a pilot hole of predetermined size the outer diameter of a cutter according to the present invention can be less than the minimum practical outer diameter of a cutter constructed in accordance with the prior art.

Another advantage which flows from a cutter that has a thicker web section as compared with prior art cutters is that it can be made in two pieces, a tooth section and a body section, axially telescoped together in the web section and secured to one another by threads, welding, etc. The thicker web allows such telescopic connection without substantially affecting the strength of the cutter. A cutter of such two-piece construction has the obvious advantage of cost. Only the tooth section need be of expensive steel. Furthermore, when the teeth become worn, only the tooth section need be replaced rather than the entire cutter.

A thicker web section also permits the forming of more teeth around the periphery of the cutter since it can withstand more torque and thrust. A greater number of teeth results in more cutting edges and faster cutting action.

In the case of cutters of the type illustrated in FIGS. 5 through 8 and FIG. 9 where each tooth is formed with four cutting edges, in the absence of special considerations, it is preferred to form the two inner cutting edges to about the same width and the two outer cutting edges to about the same width. However, special consideration may dictate otherwise; for example, if it is desired to cut a very smooth surface on the central cylindrical slug, then the innermost cutting edge 34 should be substantially narrower than the next radially successive cutting edge 36. In any event, the wider of these two edges should not be wider than the depth of flute 22. On the other hand, if it is desired to cut an extremely smooth hole in a workpiece, then the outermost cutting edge 72 should be considerably narrower than the next radially successive cutting edge 70. If it is desired to cut both a smooth wall hole and a central slug having a smooth side wall, then the innermost and outermost cutting edges should be narrower than the intermediate cutting edges. In any event, where the cutter is designed for cutting holes in steel and has at least four cutting edges, best results are normally obtained where the widest cutting edge has a width of not more than about 0.0625 inches. However, if increased rigidity is desired, this cutting edge width can be increased considerably by as much as two or three times.

Likewise, although it is preferred to form the crest between back-off faces 56,58 so that it intersects the outermost cutting edge, for certain applications the back-off faces may be ground so that the crest intersects one of the other cutting edges. For example, if the cutter is being used to form a hole in two or more workpieces which are stacked on one another and the innermost cutting edge has a relatively large positive radial inclination angle, say 25°, then the crest between the two back-off faces should lie very close to the inner periphery of the side wall of the cutter. With such a cutter, if the crest or the high point of the cutter is located closely adjacent the inner periphery of the cutter side wall, little difficulty is encountered in feeding the cutter through both of the overlying workpieces. However, as shown in FIGS. 10 through 15, if the innermost cutting edge has a low or negative inclination angle, the two back-off faces can intersect along the outermost cutting edge and the cutter can still be used for cutting holes in stacked material.

The high point of the cutter can be shifted to the inner cutting edge 34 without changing the location of crest 74. Since the back-off face 56 inclines upwardly in a circumferential direction, it follows that if the shoulders 51,54 are increased in length sufficiently, crest 74 will be spaced above, rather than below, edge 34. In this case edge 34 will initate the cutting action and will penetrate through the uppermost workpiece before crest 74. Thus, if edge 34 is maintained at a very small width, the small lip remaining on the cut slug will not prevent it from moving up into the bore of the cutter so that the cutter can freely penetrate through the underlying workpiece.

Since a chip tends to expand slightly immediately after being cut, it is desirable to grind surface 28 of flute 22 so that the flute has its maximum radial depth at the junction of surfaces 28,32. This reduces to a minimum the frictional resistance of the chip cut by edge 38 against the inner wall of the flute.

I claim:

1. An annular hole cutter comprising, a cutter body having a generally cylindrical annular side wall having a plurality of cutting teeth spaced circumferentially around the lower end thereof and having means for mounting the cutter on a rotary driving member; a plurality of flutes extending upwardly around the outer periphery of said annular wall from the lower end thereof; each tooth being connected with the next adjacent tooth by a circumferentially extending web at the inner periphery of said annular wall, said webs being juxtaposed radially with said flutes; each flute having circumferentially spaced and generally radially extending leading and trailing side walls and a circumferentially extending inner wall, said inner wall defining the radially outer side of said web; each tooth having a plurality of at least three radially extending cutting edges comprising a radially inner cutting edge extending to the inner periphery of said wall, at least one radially intermediate cutting edge, and at least one radially outer cutting edge, each of said inner and intermediate cutting edges on each tooth being formed on said web, said inner cutting edge being staggered circumferentially forwardly in the direction of rotation of the cutter relative to the intermediate cutting edge sufficiently as to cause each of said edges to cut a separate chip when the cutter is rotated and fed into a workpiece; said web being formed with a gullet extending upwardly from each of the inner and intermediate cutting edges of each tooth, said gullets opening radially outwardly into the radially adjacent flute and each having a radially inner face recessed into the radially outer side of said web and sloping radially outwardly in an upward direction; the outer cutting edge being staggered circumferentially rearwardly from the intermediate cutting edge so as to cut a separate chip, said outer cutting edge defining at least in part the lower end of the circumferentially trailing side wall of the adjacent flute; and each flute having a radial dimension not less than the radial dimension of the widest of the inner and intermediate cutting edges and a circumferential dimension substantially greater than its radial dimension whereby, when the cutter is rotated and fed axially into a workpiece, the chips formed by the inner and intermediate cutting edges on the web portion of the cutter side wall are directed by said inner faces of the gullets upwardly and radially outwardly into the radially adjacent flute.

2. An annular cutter as called for in claim 1 wherein the thickness of said web is more than one-half the thickness of said annular wall.

3. An annular cutter as called for in claim 1 wherein the radial depth of the flute increases in an upwardly direction.

4. An annular cutter as called for in claim 1 wherein the circumferential distance between the leading and trailing side walls of each flute is maximum adjacent the upper end of the flute.

5. An annular cutter as called for in claim 1 wherein the thickness of said web is more than one-half the thickness of said annular wall.

6. An annular cutter as called for in claim 1 wherein the radially outer end of said inner cutting edge is connected with the radially inner end of the intermediate cutting edge by a circumferentially extending shoulder on said web.

7. An annular cutter as called for in claim 6 wherein said intermediate cutting edge extends radially outwardly from said shoulder to the radially inner wall of said flute.

8. An annular cutter as called for in claim 25 wherein said inner wall of said flute forms a circumferentially extending shoulder between the radially outer end of said intermediate cutting edge and the radially inner end of the outer cutting edge and said outer cutting edge extends radially outwardly from said inner wall of the flute.

9. An annular cutter as called for in claim 1 wherein said radially inner, intermediate and radially outer cutting edges are staggered axially relative to one another.

10. An annular cutter as called for in claim 1 wherein each tooth is formed with a radially inner back-off face which inclines axially upwardly in a radially inward direction and a radially outer back-off face which inclines axially upwardly in a radially outward direction, said back-off faces intersecting in a crest which inclines axially upwardly in a circumferentially rearward direction relative to the direction of rotation of the cutter, said radially inner back-off face being co-extensive with at least the inner and intermediate cutting edges, said crest and the radially outer ends of said inner and intermediate cutting edges being spaced apart axially.

* * * * *

UNITED STATES PATENT AND TRADEMARK OFFICE
CERTIFICATE OF CORRECTION

PATENT NO. : 4,452,554
DATED : JUNE 5, 1984
INVENTOR(S) : Everett D. HOUGEN

It is certified that error appears in the above–identified patent and that said Letters Patent are hereby corrected as shown below:

Column 14, Line 46   Cancel "25" and insert -- 7 --

Signed and Sealed this

Sixth Day of November 1984

[SEAL]

Attest:

GERALD J. MOSSINGHOFF

Attesting Officer

Commissioner of Patents and Trademarks